G. W. GRISWOLD.
Lamp Chimney.

No. 112,446.

Patented Mar. 7, 1871.

Witnesses.
W. S. Henderson
Edmund Masson.

George W. Griswold
By atty. A. B. Stoughton.

United States Patent Office.

GEORGE W. GRISWOLD, OF FACTORYVILLE, PENNSYLVANIA.

Letters Patent No. 112,446, dated March 7, 1871.

IMPROVEMENT IN LAMP-CHIMNEYS.

The Schedule referred to in these Letters Patent and making part of the same.

*To all whom it may concern:*

Be it known that I, GEORGE W. GRISWOLD, of Factoryville, in the county of Wyoming and State of Pennsylvania, have invented certain new and useful Improvements in Shields for Glass Chimneys used on Lamps, &c.; and I do hereby declare the following to be a full, clear, and exact description thereof, reference being had to the accompanying drawing making a part of this specification, in which—

Figure 1:
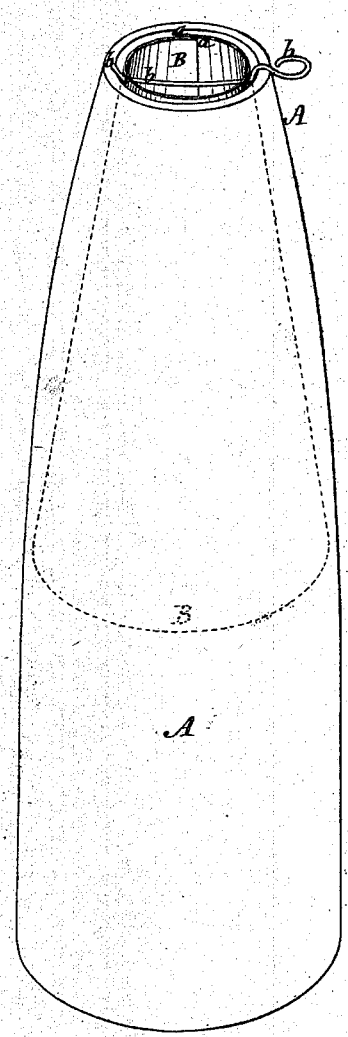
Figure 1 represents a chimney with the shield therein.
Figure 2:
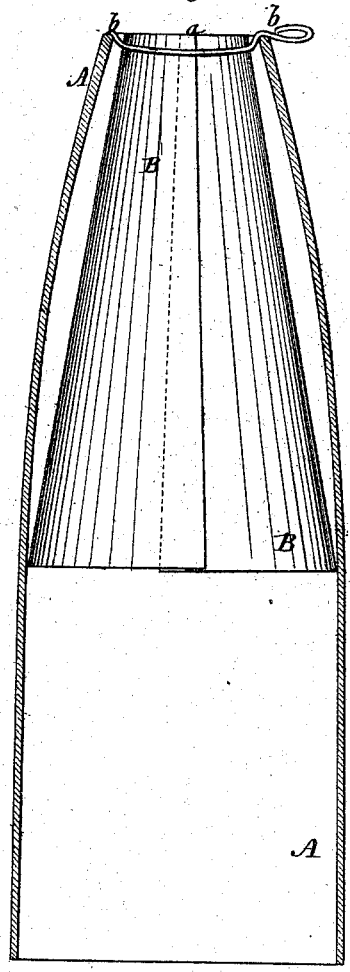
Figure 2 represents a vertical section through the same.
Figure 3:
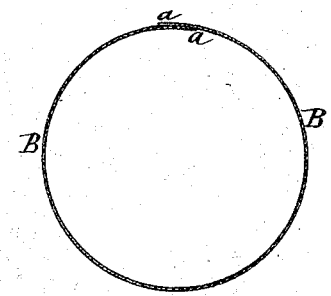
Figure 3 represents a top plan of the shield.

I am aware that many forms and kinds of shields have been essayed for glass chimneys, to prevent them from cracking and breaking by the heat of the flame of a lamp or other burner.

My invention consists in an attachable and removable shield of metal, which is suspended within the glass chimney, and can expand and contract without injury to itself, and, at the same time, shield the glass chimney surrounding it from sudden and intense heat, and admit of its free expansion.

To enable others skilled in the art to make and use my invention, I will proceed to describe the same with reference to the drawing.

A represents a glass chimney, which may be of any of the known and preferred shapes or forms.

B is a metal shield, of conical or such other form as will admit of its easy application to a chimney.

This shield B, instead of having its edges $a, a$ soldered or riveted, as is the common way, has its edges simply lapped over, as seen in the drawing, which not only allows it to expand and contract freely by the heat of the flame, but allows it to be fitted to chimneys of different sizes without preventing or restraining the expansion and contraction of the glass chimney.

At $b$ is represented a way of holding the shield to the chimney by a bent wire or rod. Any other fastening that will admit of an easy removal and replacement of the shield would answer as well as that shown. And, instead of a simple free lap-joint in the shield, any other equally as free joint may be used.

What I claim is—

In combination with a glass chimney for lamps, a removable and replaceable and freely-expanding and contracting shield, suspended within the chimney, and that not only protects the glass from the heat of the lamp or burner, but also allows the glass surrounding it to contract and expand unrestrainedly, as set forth and described.

GEORGE W. GRISWOLD.

Witnesses:
CHRISTIAN DOOLITTLE,
NELSON DOOLITTLE.